United States Patent [19]

Kidode et al.

[11] 4,326,202
[45] Apr. 20, 1982

[54] IMAGE MEMORY DEVICE

[75] Inventors: Masatsugu Kidode; Haruo Asada; Mitsuo Tabata, all of Kawasaki, Japan

[73] Assignee: The President of the Agency of Industrial Science & Technology, Tokyo, Japan

[21] Appl. No.: 133,574

[22] Filed: Mar. 24, 1980

[30] Foreign Application Priority Data

Mar. 26, 1979 [JP] Japan ............................. 54-34256

[51] Int. Cl.³ .............................................. G06F 3/14
[52] U.S. Cl. ................................... 340/799; 340/789
[58] Field of Search ................ 340/789, 798, 799, 800

[56] References Cited

U.S. PATENT DOCUMENTS 4,011,556  3/1977  Tochitani et al. .................. 340/799
4,197,590  4/1980  Sukonick et al. ................... 340/799
4,237,543 12/1980  Nishio et al. ........................ 340/799
4,243,987  1/1981  Bobick ................................ 340/799

Primary Examiner—Alvin H. Waring
Attorney, Agent, or Firm—Young & Thompson

[57] ABSTRACT

The invention provides an improved image memory device including an image processing memory unit incorporated into a universal image processing device and an address switching control circuit connected thereto, wherein an address data for raster display and an address data fed from an external input-output device are periodically selected by an address switching control circuit for supply to the image processing memory unit so that the memory unit may be accessed by an external input-output device without intercepting the raster display with remarkably reduced data transfer time.

1 Claim, 5 Drawing Figures

IMAGE MEMORY DEVICE

BACKGROUND OF THE INVENTION

The invention relates to an universal image processing device utilizing an electronic computer and particularly to an image memory device intended to be incorporated into a universal image processing device.

With development of the electronic computer, various attempts have been made to utilize the memory processing function of the computer for the image processing such as analyses of aerial photos and medical photos including a detection of cancer cells. In the conventional measures, however, the most appropriate image processing method has not been definitely concluded by a single algorithm other than the operator's judgement of the image in a trial and error way which usually requires an extremely extended processing time. On the other hand, because of two dimensional arrangement of the image data, the data overflows the capacity of the main memory unit of the electronic computer as the image to be processed is enlarged with requirement of an additional external memory device of greater capacity, for which reason the highly-integrated IC memory has recently been developed and supplied for commercial use and is used for the external memory device.

In the image processing device incorporating the IC memory unit, the random data access by the selected address data is usually performed by intercepting the image display or in either of the horizontal blanking period or vertical blanking period of the raster scanning for image display. The former method with interception of scanning, however, entails the inconvenience that the monitoring display is completely ceased during the transfer period of the great amount of data whereas the latter method utilizing the blanking period needs an extended transfer time.

SUMMARY OF THE INVENTION

After intensive research and study to overcome the foregoing problems there is provided an image memory device, in which an image processing main memory unit is provided with an address switching control circuit to which a raster display address control circuit and an external device access address control circuit are connected, so that upon activation of the address switching control circuit a display data read-out period when a signal from the raster display address control circuit is fed into the main memory unit for reading out the data to be displayed and a transfer period when a signal from the external device access address control circuit is fed into the main memory unit for transferring the data between the main memory unit and external device are selectively and periodically repeated, and the main memory unit is accessed during at least one data read-out period to read the data which is then subjected to a raster display in the next transfer period and read-out period.

OBJECTS OF THE INVENTION

A general object of the invention is to provide an image memory device which provides a continuous image display with a high-speed data access to the random address in the universal image processing device.

Another object of the invention is to provide an image memory device which provides a continuous image display and a high-speed data access to the random address with reduced data transfer time.

Other objects and advantages of the invention will become obvious after considering the detailed discussion of the invention in connection with the preferred embodiments thereof shown in the accompanying drawings.

DESCRIPTION OF THE PREFERRED EMBODIMENT

Figure 1:
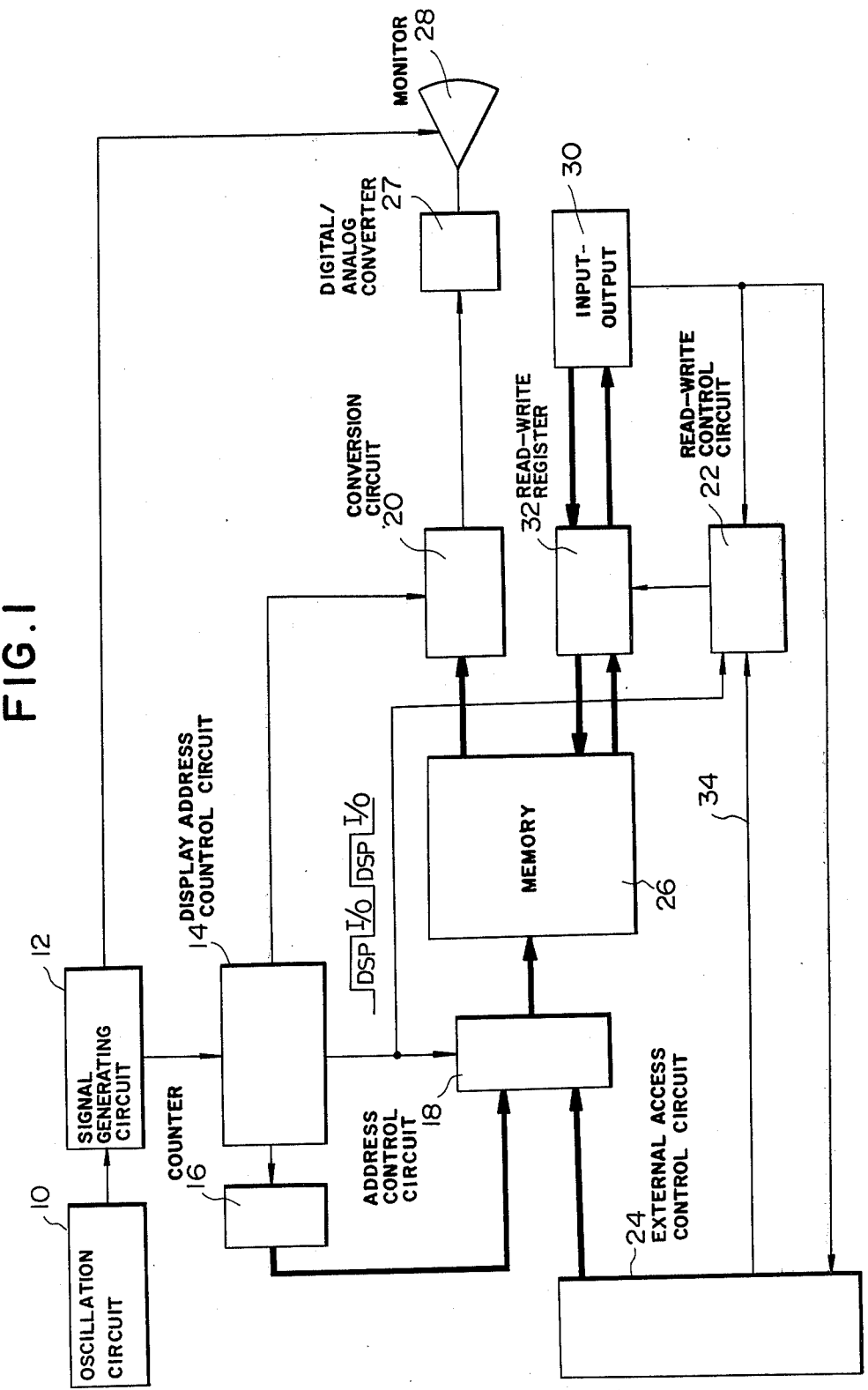
FIG. 1 is a block diagram showing an embodiment of the image memory device according to the invention.

In FIG. 1, the reference numeral 10 is an oscillation circuit an output terminal of which is connected to a synchronization signal generating circuit 12 which is in turn connected at one of its output terminals to a display address control circuit 14. The display address circuit 14 provides four output terminals which are connected respectively to an display address counter 16, an address switching control circuit 18, a parallel-input and serial-output conversion circuit 20 and to a read-write control circuit 22 as hereinafter fully described. The output terminal of the display address counter 16 is connected to one of the input terminals of the address switching control circuit 18 and the other input terminal is connected to an output terminal of an external device access address control circuit 24. An output terminal of the address switching control circuit 18 is connected to a main memory unit 26 which is X-bits in length, Y-bits in width and N-bits in depth. The dynamic random access memory chip with 16K bits per chip (nominal access time is 150 ns, and cycle time is 375 ns) is preferably used for the main memory element. One of the output terminals of the main memory unit 26 is connected to the parallel-serial conversion circuit 20 the output terminal of which is in turn connected to a monitor device 28 through a digital/analog converter 27. One of the output terminals of the synchronous signal generating circuit 12 is connected to the monitor device 28. The external input-output device 30 e.g. an electronic computer, a flying spot scanner with random scanning function or a specialized processing device with high-speed image data processing function is connected to the external device access address control circuit 24 and also to the read/write control circuit 22. The read-write register 32 is connected between the external input-output device 30 and the main memory unit 26 and is controlled by the output signal fed from the read-write control circuit 22. The reference numeral 34 stands for a connecting line between the external device access address control circuit 24 and the read-write control circuit 22.

The function and effect obtainable from the device according to the invention will be described hereinafter.

Figure 2:
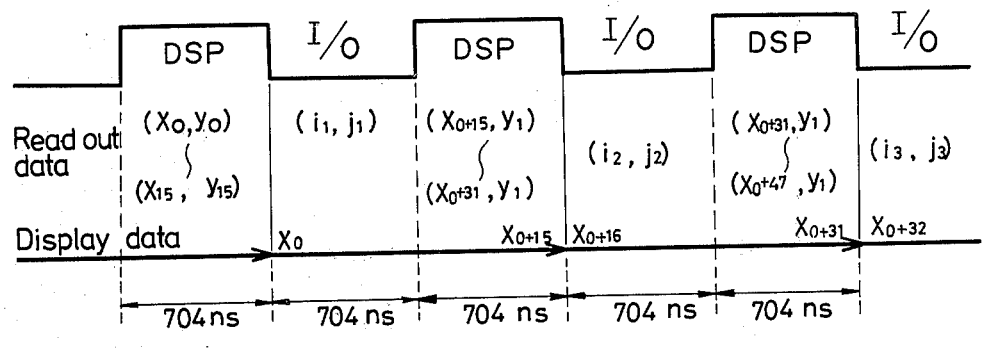
FIG. 2 is a wave form diagram of the address switching signal for activating the address switching control circuit incorporated in the device of the invention.

The synchronous signal generating circuit 12 provides a synchronization signal for the display in accordance with the output signal of the oscillation circuit 10. This synchronous signal is fed on the one hand into the display address control circuit 14 to generate an address switching signal for the address switching control circuit 18 as shown in FIG. 2 and is converted on the other hand into the display address signal (x, y) through the display address counter 16. The address switching signal is fed into the read-write control circuit 22 for use as a control signal of the read-write register 32 and also is converted into a load shift pulse to energize the parallel-serial conversion circuit 20.

In FIG. 2, when the address switching signal is fed from the display address control circuit 14 to the address switching control circuit 18 and then supplied to the main memory unit 26 for entering into the display data read-out period (hereinafter referred to as the DSP period) when the data to be displayed is read out, the display address signal (x, y) is selected at the address switching control circuit 18 for identifying the address of the main memory unit 26 from which the data of the N addresses fraction in the X direction are simultaneously read out and then fed into the parallel-serial conversion circuit 20. Then, when the address switching signal is supplied to the main memory unit for entering into the transfer period (hereinafter referred to as the I/O period) when the data is transferred between the main memory unit and the external device, the data stored in the parallel-serial conversion circuit 20 is subjected to the parallel-serial conversion and converted into an analog signal by the digital-analog converter 27 for display by the monitor 28. In this case, the data of the N addresses fraction is displayed on the monitor throughout the I/O period as well as the DSP period, which is one of the important characteristics of the invention. In the I/O period, the external device access address signal (i, j) in FIG. 4 fed from the external device access address control circuit 24 is selected by the address switching control circuit 18 to identify an address signal of the main memory unit 26. Accordingly, the data stored in the read-write register 32 is written into the main memory unit 26 in accordance with the address signal. On the contrary, the data in the main memory 26 is similarly read out during the I/O period.

When the DSP period starts again, the display address signal (x, y) fed from the display address counter or the address generating circuit 16 is selected by the address switching control circuit 18, although the address data of (X+N) is supplied from the display address counter 16 and the data read out from the main memory 26 in accordance with the address data is subjected to the parallel-serial conversion by the parallel-serial conversion circuit 20 and then transmitted into the digital/analog converter 27 during the next I/O period.

In the next I/O period, the address data fed from the external device access address control circuit 24 is selected by the address switching control circuit 18 and the read-write operation takes place in accordance with this address signal.

Figure 3:
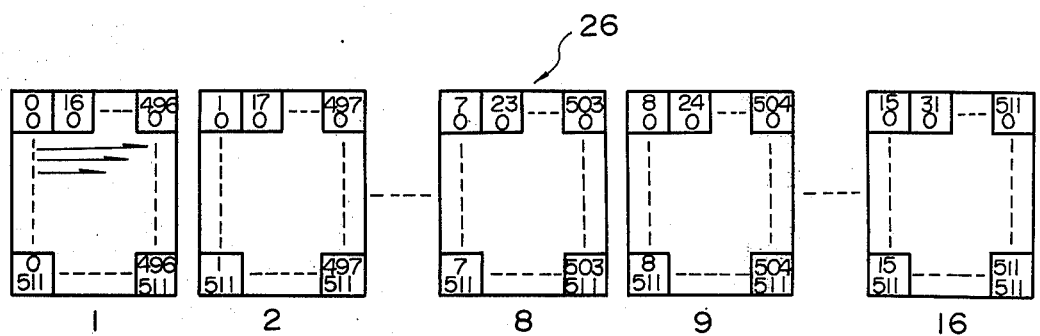
FIG. 3 is a pictorial diagram of the main memory unit to be accessed in the device of the invention.

In the main memory unit 26, the scanning takes place depending on the display address signal (x, y). Namely, where the main memory unit 26 consists of elements of N=16, the raster scanning appears from the left to the right and from the top to the bottom on each memory element as shown in FIG. 3 where an upper numeral indicates the X address whereas the lower numeral indicates the Y address. Consequently, the address data is scanned as $x=1\sim X/y=1$, $x=1\sim X/y=2$, ..., $x=1\sim X/y=Y$. Accordingly, where the data is stored in the memory elements as shown in FIG. 3, the data of N=16 addresses may be simultaneously read out from the memory element responding to a single address signal.

Figure 4:
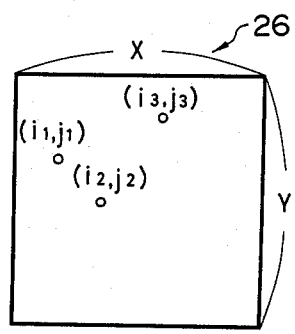
FIG. 4 is a pictorial diagram of the main memory unit showing the random access to the main memory by the external device.
Figure 5:
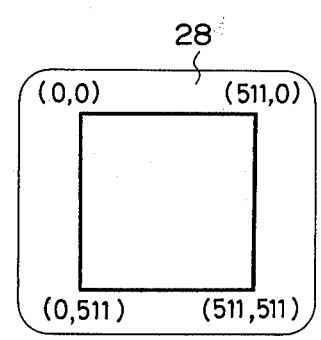
FIG. 5 is a pictorial plan view of an image surface of the monitor device which is incorporated into the device of the invention to perform a raster-display of the accessed data.

When a horizontal scanning period of the monitor device 28 is set in 63.5 $\mu$s and the period is divided into 720 equal moments among which 512 moments are used for displaying 512 points, and the vertical scanning is similarly constructed to display 512 points, (512×512) points are displayed in one picture and the time required for displaying a single point is 63.5 $\mu$s × 1/720 = 88 ns as will be readily appreciated. The data access by the external device such as an electronic computer is carried out at random and not in order such as ($i_1$, $j_1$), ($i_2$, $j_2$) ... ($i_8$, $j_8$). Namely, the data fed from the external input-output device 30 through the read-write register 32 is stored in the main memory unit under the control of the read-write control circuit 22 in accordance with the external device access address signal fed from the external device access address control circuit 24 as shown in FIG. 4.

As hereinbefore fully described, in accordance with the invention, the address switching control circuit is provided before the image memory unit circuit and the address switching control circuit is switched to select periodically the display address signal and the external device access address signal so that the data access is performed during the DSP period and the thus-read-out data is displayed in the succeeding I/O period and DSP period, which enables even in the high-speed, and large-capacity IC memory the continuous data display on the monitor image surface without interrupting the image display during the random access operation.

While the invention has been particularly shown and described with reference to the preferred embodiments, it will be understood that these embodiments are not limitative but various improvements and modifications may be performed without departing from the spirit and scope of the invention, for example, by incorporating a straight line generating circuit into the image memory device so that the desired addresses are stored in the address buffer, whereas the desired data is stored in the data buffer to write a straight line data in the memory without interrupting the image display.

What is claimed is:

1. In an image memory device comprising an image memory unit for storing two-dimensional data, a display device for raster display of the data stored in the image memory unit and an input-output device for reading and/or writing the data out of and/or into said image memory unit; the improvement in which the image memory unit is provided with an address control circuit which generates a display address switching signal based on a synchronous signal for operating said display device, an address switching control circuit is further provided in front of the image memory unit, which selects periodically a raster display address data and an address data from said input-output device based on said display address switching signal, and means whereby the data access takes place during the period of reading out the display data of said display address switching signal and then the accessed data is displayed on the display device throughout the periods of transmitting the data between the image memory unit and the input-output device and of reading out the succeeding display data.

* * * * *